(12) United States Patent
Li et al.

(10) Patent No.: US 12,129,606 B2
(45) Date of Patent: Oct. 29, 2024

(54) METHOD AND DEVICE FOR DIRT INTERCEPTING PERMEABLE PAVEMENT

(71) Applicant: Beijing University of Civil Engineering and Architecture, Beijing (CN)

(72) Inventors: Haiyan Li, Beijing (CN); Zhichao Yang, Beijing (CN); Yan Huang, Beijing (CN); Liyuan Wu, Beijing (CN); Xiaoran Zhang, Beijing (CN); Ziyang Zhang, Beijing (CN); Jinxi Li, Beijing (CN)

(73) Assignee: Beijing University of Civil Engineering and Architecture, Beijing (CN)

( * ) Notice: Subject to any disclaimer, the term of this patent is extended or adjusted under 35 U.S.C. 154(b) by 1275 days.

(21) Appl. No.: 16/808,404

(22) Filed: Mar. 4, 2020

(65) Prior Publication Data

US 2020/0354900 A1    Nov. 12, 2020

(30) Foreign Application Priority Data

May 7, 2019  (CN) .......................... 201910376759.2

(51) Int. Cl.
| | |
|---|---|
| *E01C 11/22* | (2006.01) |
| *B32B 3/30* | (2006.01) |
| *B32B 5/16* | (2006.01) |
| *B32B 13/04* | (2006.01) |
| *E01C 7/32* | (2006.01) |

(52) U.S. Cl.
CPC .............. *E01C 11/225* (2013.01); *B32B 3/30* (2013.01); *B32B 5/16* (2013.01); *B32B 13/047* (2013.01); *E01C 7/32* (2013.01); *B32B 2264/10* (2013.01); *B32B 2307/726* (2013.01)

(58) Field of Classification Search
CPC . E01C 7/32; E01C 11/225; B32B 3/30; B32B 5/16; B32B 13/047; B32B 2264/10; B32B 2307/726
USPC .............................. 404/17–20, 27–31, 72, 75
See application file for complete search history.

(56) References Cited

U.S. PATENT DOCUMENTS

| | | | | |
|---|---|---|---|---|
| 1,463,979 A | * | 8/1923 | Stubbs ................... | E01C 7/325 404/19 |
| 2,259,374 A | * | 10/1941 | Gramelspacher ......... | E01C 5/14 404/28 |
| 2,353,027 A | * | 7/1944 | Goodwin ................. | E01C 3/06 427/139 |
| 3,322,047 A | * | 5/1967 | Bieber .................. | E01C 13/065 404/28 |

(Continued)

*Primary Examiner* — Raymond W Addie
(74) *Attorney, Agent, or Firm* — Bayramoglu Law Offices LLC

(57) ABSTRACT

A method for permeable pavement of dirt interception comprises laying a permeable structure layer with a toothed groove between the base layer and the transition surface of the cushion layer or directly setting the upper surface of the cushion layer as a toothed structure; in the base layer, laying at least one layer of dirt interception trough; providing a water-permeable coating or fine sand at the bottom of the sewage interception trough; the present invention traps the dirt between the base layer and the cushion layer that are most likely to cause void blocking in the base layer, close to the shallow part of the surface layer is used to remove dirt by high-pressure flushing operations.

9 Claims, 3 Drawing Sheets

(56) References Cited

U.S. PATENT DOCUMENTS

| | | | | |
|---|---|---|---|---|
| 3,446,122 | A | * | 5/1969 | Unterstenhoefer ... E01C 13/065 404/28 |
| 3,870,422 | A | * | 3/1975 | Medico, Jr. ............. E01C 7/142 404/31 |
| 5,007,764 | A | * | 4/1991 | Pontynen .................. E01C 3/06 404/31 |
| 5,730,548 | A | * | 3/1998 | Brero ....................... E01C 3/006 404/71 |
| 5,836,715 | A | * | 11/1998 | Hendrix .................. E01C 11/16 404/70 |
| 8,807,876 | B2 | * | 8/2014 | Affi ........................ E02D 31/12 404/28 |

* cited by examiner

US 12,129,606 B2

METHOD AND DEVICE FOR DIRT INTERCEPTING PERMEABLE PAVEMENT

CROSS REFERENCE TO THE RELATED APPLICATIONS

This application is based upon and claims priority to Chinese Patent Application No. 201910376759.2, filed on May 7, 2019, the entire contents of which are incorporated herein by reference.

TECHNICAL FIELD

This invention relates to a permeable pavement of dirt interception, which is used to alleviate the problem that the gaps cannot be used under long-term use conditions because of clogging by dirt.

BACKGROUND

In modern cities, the groundwater level has fallen severely, causing a series of hydrological changes in urban areas and the settlement of infrastructure facilities. The main incentives are not only groundwater overexploitation, but also large areas of land covered by impervious facilities, such as roads, buildings, and parking. It is difficult for natural precipitation to infiltrate the ground to supplement groundwater from these underlying surfaces, and the stagnant water caused by heavy rain can easily cause problems such as traffic congestion, damage of facilities, and the spread of diseases. Such a vicious cycle exacerbates the problem of urban groundwater depletion. Therefore, the requirements for precipitation discharge are increasing.

At the Central Urbanization Working Conference in 2013, General Secretary Xi Jinping pointed out: "It is necessary to build a sponge city with natural accumulation, natural penetration, and natural purification." However, for artificial facilities such as urban roads and squares, it is not easy to meet its carrying ability and functional needs, but also to achieve naturally penetrate and purify. Permeable pavement, as an alternative, has the advantages of water permeability, certain purification ability and satisfying use functions. At the same time, this solution also has some disadvantages. With the increase of the use time, almost all the pavement will have the problem of gap blocking.

In order to solve the problem of the blockage of the permeable pavement, many measures have been adopted. The obvious treatment effect is to strengthen the maintenance of the permeable pavement surface. Including 1. road cleaning; 2. vacuum cleaning; 3. high pressure washing. However, these methods have a better effect on the blockage of the gap in the road surface and shallow layers, but the deeper of permeable pavement cannot be reached.

SUMMARY

Through the improvement of the permeable pavement structure and process, the present invention enables the dirt to be trapped closer to the shallow layer so that the cleaning operation can be touched. Although deeper dirt cannot be removed, it can also improve the pavement structure to reduce the degree of gap blocking and prolong the service life of the permeable pavement.

In one aspect, there is provided a permeable pavement of dirt interception method. Which comprises Step A: pave a permeable structure layer with a toothed groove between the base layer and the transition surface of the cushion layer or directly set the upper surface of the cushion layer as a toothed structure;

Step B: laying at least one layer of dirt interception groove in the base layer;

Step C: setting a permeable coating or fine sand on the bottom of the interception groove;

Preferably, the toothed groove base layer is constructed on the spot by compacting the crushed stone concrete. The main working principle is to guide the dirt particles to be distributed vertically in the base layer as much as possible during use, thereby reducing the possibility of blocking the permeation layer.

More preferably, the toothed groove base layer is made of crushed stone porous concrete material, which is made in advance in the factory and then transported to the construction site for paving. Its material properties are similar with those of permeable bricks and can achieve the same effect.

Preferably, the cross section of the dirt interception groove is a downwardly protruding arc shape or a downwardly protruding bent structure that does not exceed 180 degrees.

After the pavement is completed by the dirt intercepting permeable pavement method of the present invention, the water-permeability principle of the pavement layer is that when the water flow with dirt leaks downward from the gap in the base layer, touching the bottom of the interception groove which includes a permeable coating or fine sand. Part of the water flow is left in the interception groove, and the other part of the water flow continues to leak downwards. Through the interception of at least one layer of the interception groove, some water flow with dirt is retained in the interception groove. Another part of the water flow is slowly infiltrating, or migrated to the side by capillary phenomenon, so that the dirt in the other part of the water flow is trapped and stored in the grass.

For ordinary tiled bedding, dirt particles are laid on the bedding, which can easily block the leakage gap. In the permeable pavement of dirt interception method of the present invention, when a cogged structure is added between the cushion layer and the base layer, or when the upper surface of the cushion layer is directly made into a toothed groove structure, the dirt is accumulated in a stacked manner, and the water flow is caused by the teeth. The fine sand surface on the inclined surfaces on both sides of the trough structure leaks downward, to a certain extent, delaying the time when the cushion gap is completely blocked, thereby achieving the purpose of increasing the service life of the permeable pavement.

The positive effects of the dirt interception permeable pavement method of the present invention can be as follows: 1. The present invention traps the dirt between the base layer and the cushion layer that are most likely to cause clogging in the base layer, and the dirt in the shallow part near the surface layer can be removed by high-pressure flushing. 2. By adjusting the structure of the base layer and the cushion layer, without increasing the thickness of the pavement, the clogging time of transition surface between the base layer and the cushion layer will delay due to the design of the alveolar structure. As a result, the service life of the permeable pavement is increased.

A second aspect of the present invention provides a permeable paving structure, which includes a water-retaining layer, a surface layer, a screed layer, a base layer, a cushion layer, and an anti-filtration isolation layer. The base layer is provided with at least one dirt interception groove.

Preferably, a stagnant layer, a surface layer, a screed layer, a base layer, a cushion layer, and an anti-filtration isolation layer are provided from the ground surface downwards.

More preferably, the upper surface of the cushion layer is a cogging structure.

More preferably, a permeable structure layer of a toothed groove is provided between the base layer and the cushion layer.

Preferably, the bottom of the interception groove is provided with a permeable coating or fine sand; the cross-section of the interception groove is a downwardly protruding arc or a downwardly protruding bending structure that does not exceed 180 degrees.

Preferably, the dirt interception grooves are staggered up and down or left and right in the base layer.

The working principle of the permeable pavement structure described in the second aspect of the present invention is that when the water flow with dirt leaks downward from the gap in the grassroots level, it encounters a dirt interception groove including a permeable coating or fine sand at the bottom of the groove, and part of the water flow was left in the interception groove, another part of the water flow continued to leak downward, and through the interception of at least one layer of the interception groove, a part of the water flow with the dirt was retained in the interception groove; the other part of the water flow was slow in the process of infiltration, the capillary phenomenon migrates to the side, so that the dirt in another part of the water flow is trapped and stored in the base layer.

For ordinary tiled bedding, dirt particles are laid on the bedding, which can easily block the leakage gap. In the dirt interception and permeable pavement method of the present invention, when a cogged structure is added between the cushion layer and the base layer, or when the upper surface of the cushion layer is directly made into a toothed groove structure, the dirt is accumulated in a stacked manner, and the water flow is caused by the teeth The fine sand surface on the inclined surfaces on both sides of the trough structure leaks downward, to a certain extent, delaying the time when the cushion gap is completely blocked, thereby achieving the purpose of increasing the service life of the permeable pavement.

A third aspect of the present invention provides a dirt interception and permeable paving method, which includes Step AA: Prefabricated integrated board with toothed grooves is made in advance. Porous concrete material mainly composed of crushed stones is transported to the pavement and directly laid. The board is filled with a base layer and then compacted.

Step AB: Use natural gravel to lay the cushion (the laying thickness is determined by the project requirements). The top of the cushion is laid alternately with permeable gravel and natural gravel (the separation distance is determined by the project requirements), and then the pavement is compacted multiple times. At this moment, the top of the cushion layer forms a toothed groove structure.

Step BB: Use an integrated coulter to plow a certain thickness of the base layer out of the groove, and at the same time use permeable paint or fine sand to padded from the feeding port to form a dirt interception trough;

Preferably, the pitch and depth of the interception groove are determined according to the requirements of the pervious pavement. The dirt interception trough reduces the infiltration rate of the water flow to a certain extent. By changing the coulter set to adjust the different spacing requirements, the water infiltration rate of the pavement can be met.

Preferably, steps AB and BB are performed. More preferably, steps AA and BB are performed.

The meaning of the number marks in FIG. 1 to FIG. 5 is:
1—feed inlet, 2—discharge paving opening, 3—coulter, 11—stagnation layer, 12—surface layer, 13—leveling layer, 14—base layer,
15—intercepting grooves, 16—cushions.

DETAILED DESCRIPTION OF THE EMBODIMENTS

Figure 1:
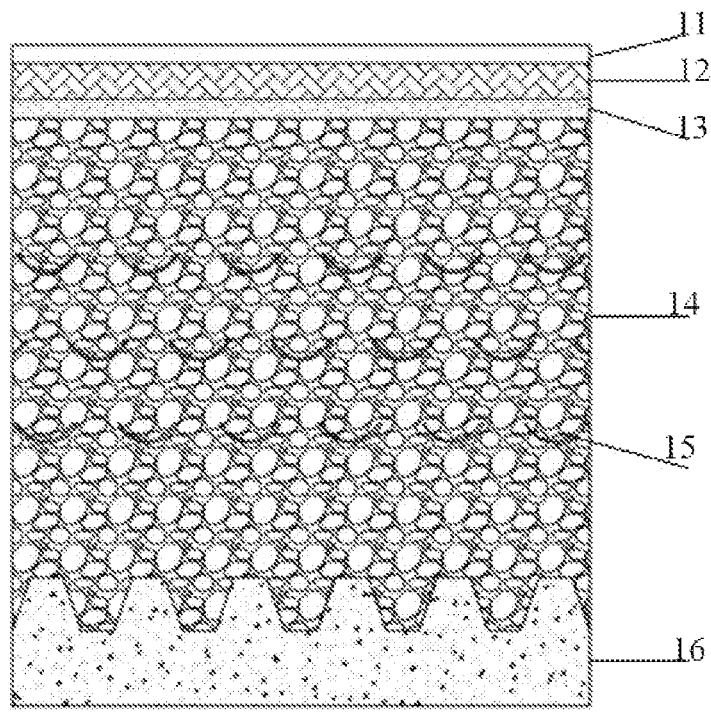
FIG. 1 is a longitudinal sectional view of a dirt interception and pervious paving structure according to a preferred example of the invention.
Figure 2:
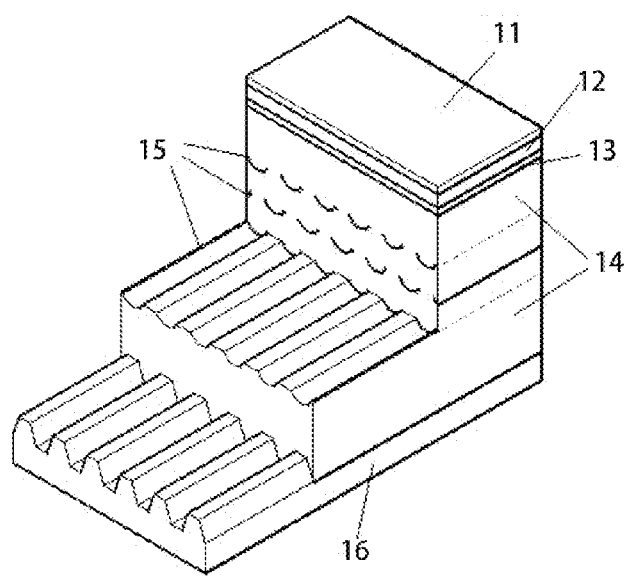
FIG. 2 is a cross-sectional view of a three-layer dirt interception and permeable pavement according to the example shown in FIG. 1.

The permeable pavement of dirt interception method provided by the present invention lays several layers of dirt interception troughs at the base layer position of the permeable pavement, and the bottom of the dirt interception trough includes a permeable coating or fine sand. The transition surface of the base layer and the cushion layer has toothed grooves, as shown in FIG. 1 and FIG. 2.

EXAMPLE 1.1

A Method for a Permeable Pavement of Dirt Interception Comprising

1. Laying a cushion 16 including a base layer 14 above the cushion 16;
2. Laying a permeable structure layer with a toothed groove between the base layer 14 and the transition surface of the cushion layer 16;
3. In the base layer 14, a three-layer dirt interception groove 15 is provided;
4. Set a permeable coating or fine sand on the bottom of the dirt interception groove 15;
5. Lay the screed layer 13, the surface layer 12, and the stagnant layer 11 in order above the base layer 14.

In this example, the toothed groove cushion layer can cause dirt to be longitudinally deposited in the toothed groove. Compared with a tiled cushion layer, it can slow down the dirt particles completely blocking the penetration gap at the interface between the base layer and the cushion layer.

In this example, the cross section of the dirt interception groove is a downwardly protruding arc shape that does not exceed 180 degrees.

EXAMPLE 1.2

A Method for Permeable Pavement of Dirt Interception Including

1. Lay the cushion 16 and directly set the upper surface of the cushion 16 as a cogging structure;

2. A base layer 14 is laid over the cushion layer 16;
3. In the base layer 14, a three-layer dirt interception groove 15 is provided;
4. A permeable coating or fine sand is provided at the bottom of the dirt interception groove 15;
5. Lay the screed layer 13, the surface layer 12, and the stagnant layer 11 in order above the base layer 14.

In this example, the cross section of the dirt interception groove 15 is a bent structure protruding downward.

In this example, the pollution interception grooves 15 of each layer are staggered. Example 2.1: A permeable pavement structure, as shown in FIG. 1-FIG. 2. Three-layer dirt interception groove 15 is provided.

In this example, a stagnant layer 11, a surface layer 12, a leveling layer 13, a base layer 14, a cushion layer 16, and an anti-filtration isolation layer are provided from the ground surface downward in this order.

In this example, the upper surface of the cushion layer 16 is a cogged structure.

In this example, the bottom of the dirt interception groove 15 is provided with a permeable coating or fine sand; the cross section of the dirt interception groove 15 is a downwardly protruding arc shape not exceeding 180 degrees.

In this example, the pollution interception grooves 15 are arranged alternately up and down in the base layer 14.

EXAMPLE 2.2

A Permeable Pavement Structure, as Shown in FIG. 1-FIG. 2, Three-Layer Dirt Interception Groove 15 is Provided In this example, a stagnant layer 11, a surface layer 12, a leveling layer 13, a base layer 14, a cushion layer 16, and an anti-filtration isolation layer are provided from the ground surface downward in this order.

In this example, a permeable structure layer of a toothed groove is provided between the base layer 14 and the cushion layer 16.

In this example, the bottom of the dirt interception groove 15 is provided with a permeable coating or fine sand; the cross section of the dirt interception groove 15 is a folded linear structure protruding downward.

In this example, the dirt interception grooves 15 are arranged alternately in the left and right in the base layer 14.

The working principle of the permeable pavement structure described in Example 2.1-2.2 is that when the water flow with dirt leaks down from the gap in the grassroots, it encounters a dirt interception trough including a permeable coating or fine sand at the bottom A part of the water flow is left in the interception groove, and the other part of the water flow continues to leak downwards. Through the interception of at least one layer of the interception groove, a part of the water flow with dirt is retained in the interception groove; In the process of slow infiltration, or the capillary moves to the side, the dirt in the other part of the water flow is trapped and stored in the grass.

When a cogging structure is added between the cushion and the base layer, or when the upper surface of the cushion is directly made into a cogging structure, the dirt is accumulated in a layered manner, and the water flow is caused by fine sand on the slopes on both sides of the cogging structure The surface leaks down to a certain extent, delaying the time when the gap of the cushion layer is completely blocked, thereby achieving the purpose of increasing the service life of the permeable pavement.

EXAMPLE 3.1

A Method for Permeable Pavement of Dirt Interception Including

Figure 3:
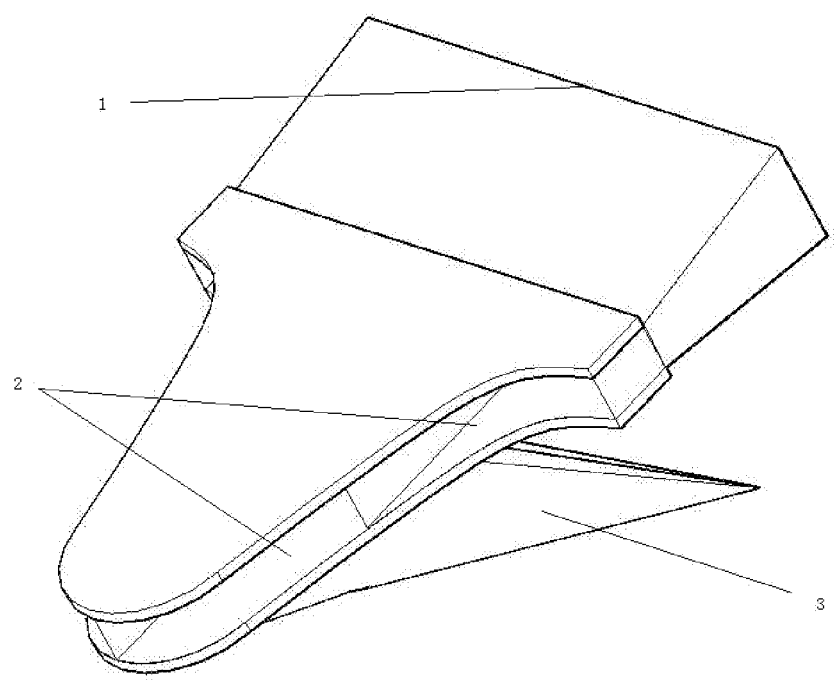
FIG. 3 is a schematic structural diagram of a preferred example of an integrated feeding plough.
Figure 4:
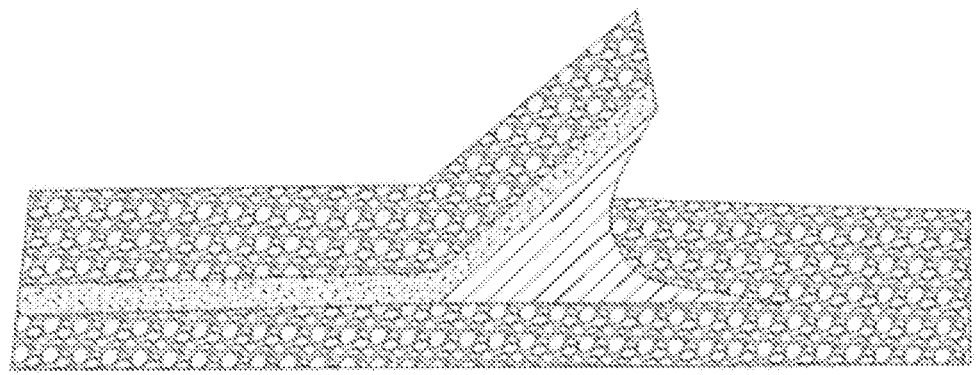
FIG. 4 is a schematic longitudinal sectional view of a disposable laying dirt interception groove in the example shown in FIG. 3.
Figure 5:
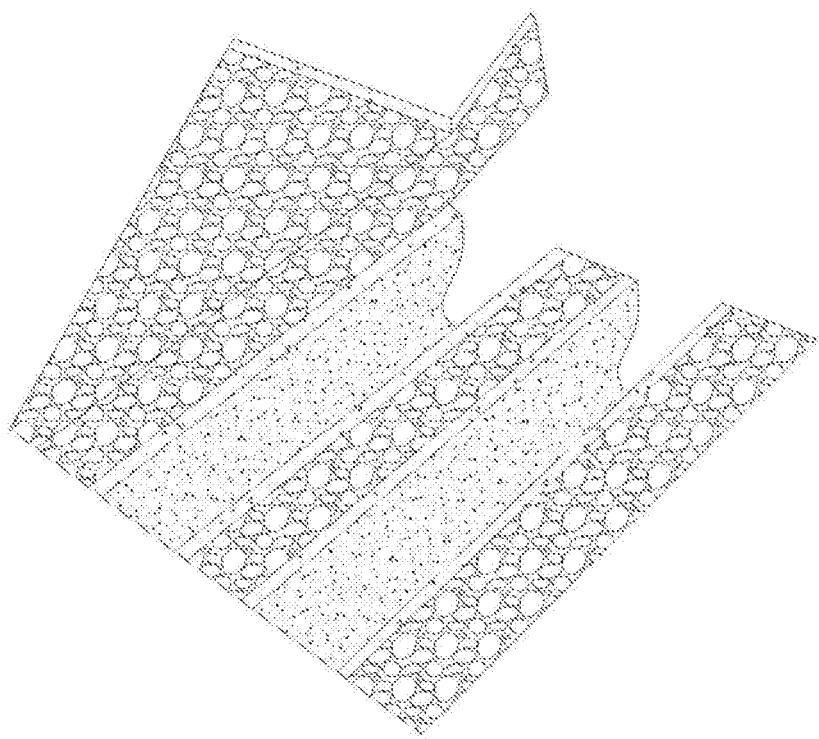
FIG. 5 is a schematic view of a one-time laying of a disposable interception groove in the example shown in FIG. 3.

S1. The cushion is laid with finer grains of sand, and the special coulter 3 shown in FIG. 3 is used to slot and fill the base gravel at the same time, thereby forming a cogged structure on the top surface of the cushion, and then compacting the base pavement multiple times S2. Use a special coulter as shown in FIG. 3 to plow a certain thickness of the base layer out of the groove. At the same time, the permeable paint or fine sand enters the coulter 3 from the feed port 1 and then is discharged from the discharge paving port 2 and padded on the base layer, so as to form a dirt intercepting groove in the base layer;

In this example, the interval and depth of the interception groove are determined according to the requirements of the pervious pavement.

The dirt interception trough reduces the infiltration rate of the water flow to a certain extent. By changing the coulter set to adjust the different spacing requirements, the water infiltration rate of the pavement can be met.

S3. Lay the screed, surface, and stagnation layers in order above the base layer.

EXAMPLE 3.2

A Method for Permeable Pavement of Dirt Interception Including

Q1. Manufacture of integrated prefabricated board with cushion groove and base gravel.

Q2. Fill the base layer on the integrated prefabricated board of the cogged cushion and the base gravel, and then compact it;

Q3. Use a special coulter as shown in FIG. 3 to plow a certain thickness of the base layer out of the groove, and at the same time pour permeable paint or fine sand from the feeding port to form a dirt interception groove in the base layer;

Q4. Leveling layer, surface layer and stagnant layer shall be laid on the base layer in turn.

What is claimed is:

1. A method for implementing a dirt intercepting permeable pavement, comprising the following steps:
    step A: laying a permeable structure layer with a toothed groove between a base layer and a transition surface of a cushion layer, or directly set an upper surface of the cushion layer as a toothed structure;
    step B: laying at least one layer of dirt interception trough in the base layer; and
    step C: setting a permeable coating or a fine sand on a bottom of an interception groove;
    wherein steps A, B, and C are performed in order.

2. The method for implementing a dirt intercepting permeable pavement according to claim 1, wherein a tooth groove base layer is constructed by compacting crushed stone concrete to guide a plurality of dirt particles to be vertical in the base layer during use, and distribution reduces a possibility of blocking a permeable layer.

3. The method for implementing a dirt intercepting permeable pavement according to claim 1, wherein a base of a tooth groove is made of a porous concrete material of crushed stone, wherein the porous concrete material of crushed stone is made in advance in a factory, and transported to a construction site for paving.

4. The method for implementing a dirt intercepting permeable pavement according to claim 1, wherein a cross-section of a dirt interception groove is a downwardly protruding arc or a downwardly protruding bending structure, wherein the downwardly protruding bending structure does not exceed 180 degrees.

5. A permeable pavement structure comprising a water-retaining layer, a surface layer, a screed layer, a base layer, a cushion layer and an anti-filtration isolation layer,
   wherein at least one dirt intercepting groove is arranged in the base layer;
   wherein a bottom of the at least one dirt interception groove is provided with a permeable coating or a fine sand; and a cross-section of the at least one dirt interception groove is downwardly protruding not exceeding 180 degrees, with a curved or downwardly bent structure.

6. The permeable pavement structure according to claim 5, wherein an upper surface of the cushion layer is a cogged structure.

7. The permeable paving structure according to claim 5, wherein a permeable structure layer of a tooth groove is provided between the base layer and the cushion layer.

8. A permeable pavement structure comprising a water-retaining layer, a surface layer, a screed layer, a base layer, a cushion layer and an anti-filtration isolation layer,
   wherein at least one dirt intercepting groove is arranged in the base layer; and
   wherein the at least one dirt interception grooves are staggered up and down or left and right in the base layer.

9. A method for implementing a dirt intercepting permeable pavement comprising:

Step AA: producing an integrated prefabricated board with a plurality of toothed grooves in advance, directly laying a porous concrete material mainly composed of a plurality of crushed stones to be transported to a construction pavement, filling a base layer on the integrated prefabricated board with the porous concrete material, and then compacting the porous concrete material;

Step AB: using natural gravel to lay a cushion, wherein a laying thickness is determined by a plurality of project requirements, laying a top of the cushion alternately with permeable gravel and natural gravel, wherein a separation distance is determined by the plurality of project requirements, and compacting the construction pavement multiple times, after the construction pavement is compacted multiple times, a top of a cushion layer forms a toothed groove structure;

Step BB: using an integrated coulter to plow a certain thickness of the base layer out of a groove, and at the same time using a permeable paint or a fine sand to be padded from a feeding port to form a dirt interception trough;

wherein step AB and step BB are performed in sequence, or step AA and step BB;

determining an interval and depth of the dirt interception trough according to a plurality of requirements of a pervious pavement, the dirt interception trough reduces an infiltration rate of a water flow to a certain extent, and adjusting a plurality of different spacing requirements by changing a coulter group to meet a plurality of requirements of the water flow.

* * * * *